United States Patent [19]

Herren

[11] Patent Number: 4,752,460

[45] Date of Patent: Jun. 21, 1988

[54] INORGANIC COMPOUNDS BASED ON BISMUTH VANADATE

[75] Inventor: Fritz Herren, Düdingen, Switzerland

[73] Assignee: Ciba-Geigy Corporation, Ardsley, N.Y.

[21] Appl. No.: 16,045

[22] Filed: Feb. 18, 1987

[30] Foreign Application Priority Data

Feb. 19, 1986 [CH] Switzerland ............................ 659/86

[51] Int. Cl.$^4$ ................................................ C09C 1/00
[52] U.S. Cl. ................................. 423/593; 106/286.2; 106/286.7; 106/288 B; 106/292; 106/306; 502/306; 502/307; 502/312; 502/321
[58] Field of Search ................ 423/593; 502/306, 307, 502/312, 321; 106/286.2, 286.7, 288 B, 292, 306

[56] References Cited

U.S. PATENT DOCUMENTS

| | | | |
|---|---|---|---|
| 3,370,971 | 2/1968 | Linton | 106/298 |
| 3,639,133 | 2/1972 | Linton | 106/298 |
| 3,843,554 | 10/1974 | Aykan et al. | 502/340 |
| 4,046,588 | 9/1977 | Einerhand et al. | 106/298 |
| 4,063,956 | 12/1977 | Higgins | 106/288 B |
| 4,115,141 | 9/1978 | Piltingsrud | 106/288 B |
| 4,115,142 | 9/1978 | Hers | 423/593 |
| 4,251,283 | 2/1981 | Balducci et al. | 106/288 B |
| 4,316,746 | 2/1982 | Rustioni et al. | 423/593 |
| 4,455,174 | 6/1984 | Wienand et al. | 156/288 B |

FOREIGN PATENT DOCUMENTS 3221338 12/1983 Fed. Rep. of Germany ...... 423/593

OTHER PUBLICATIONS

Ann. Chim. France, 3, 461–469 (1978).
Journal of Solid State Chemistry 13, 231–236 (1975).

*Primary Examiner*—Asok Pal
*Attorney, Agent, or Firm*—Harry Falber

[57] ABSTRACT

Process for mass coloring high molecular weight organic material, which comprises using a compound of the general formula (I)

$$(Bi,A)(V,D)O_4 \qquad (I)$$

in a tetragonal, scheelitelike crystal structure, in which A is an alkaline earth metal, Zn or a mixture thereof, D is Mo, W or a mixture thereof, and the molar ratios A:Bi and D:V are between 0.1 and 0.4 and 0 and 0.4 respectively.

Processes for preparing the compounds of the formula (I) are likewise described.

14 Claims, No Drawings

INORGANIC COMPOUNDS BASED ON BISMUTH VANADATE

The present invention relates to a novel process for mass colouring high molecular weight organic material with bismuth vanadate pigments, to novel bismuth vanadate/molybdate and vanadate/tungstenate compounds, to mixtures thereof, and to processes for the preparation thereof.

The most widely used inorganic yellow pigments are cadmium sulfides, lead chromates, nickel titanium yellow and iron oxide yellow. It is in respect of the coloristic application properties, in particular in respect of tinctorial purity and tinctorial strength, that iron oxide yellow and nickel titanium yellow are not satisfactory, while the cadmium sulfide and lead chromate pigments leave something to be desired in respect of weathering resistance.

Alternatives have been proposed. For instance, U.S. Pat. Nos. 4,115,141 and 4,115,142 describe bismuth vanadate as a pigmentary, bright cowslip yellow compound for colouring plastics and paints. According to these patent specifications, all the bismuth vanadate is present in the monoclinic modification ($\beta$-fergusonite). This compound is prepared by first precipitating from soluble bismuth and vanadium compounds a gellike precursor, which is then converted into the crystalline, pigmentary form either by a heat treatment at 200–500° C. or by an aqueous aftertreatment carried out under certain conditions.

A bismuth vanadate/molybdate or bismuth vanadate/tungstenate was also proposed in U.S. Pat. No. 4,455,174 as a further alternative yellow pigment. These are multiphase products which consist of a bismuth vanadate phase and a bismuth/molybdate and/or a bismuth/tungstenate phase.

U.S. Pat. No. 4,316,746 additionally describes bismuth vanadate/molybdate and bismuth vanadate/tungstenate pigments which consist in the case of bismuth vanadate/molybdate of a crystalline phase having a scheelitelike structure, while in the case of bismuth vanadate/tungstenate a two-phase product is present.

Further compounds based on bismuth vanadate are also mentioned in Ann. Chim. France 1978 (3), pages 461–469, where the ferroelectric properties of the systems $BiVO_4$–$BiNbO_4$ and $BiVO_4$–$CaWO_4$ are investigated without mention of any pigmentary properties of these compounds.

All the abovementioned bismuth vanadate/molybdate and bismuth vanadate/tungstenate pigments require for their preparation an expensive, multistage process comprising precipitation, calcination and subsequent milling. In addition, these pigments are not always satisfactory in various respects, for example in respect of certain application-related pigment properties.

The present invention provides a process for mass colouring high molecular weight organic material, which comprises using a compound of the general formula (I)

$$(Bi,A)(V,D)O_4 \qquad (I)$$

in a tetragonal, scheelitelike crystal structure, where A is an alkaline earth metal, Zn or a mixture thereof, D is Mo, W or a mixture thereof, the molar ratio of A:Bi is between 0.1 and 0.4 and the molar ratio D:V is between 0 and 0.4.

The notation (Bi,A) of the above formula (I) is to be understood as meaning that the bismuth is present in the form of the bismuth(III) ion and is partly replaced by the divalent metal cation A. Vanadium, on the other hand, is present as the vanadium(V) ion in the form of the vanadate ion and can be partly replaced by the hexavalent metal cation D as molybdate or tungstenate or mixtures thereof.

An alkaline earth metal A is for example Be, Mg, Ca, Sr or Ba, but in particular Ca or Sr.

D is preferably Mo.

Mixtures which are suitable according to the invention are mixtures of at least one alkaline earth metal and Zn or mixtures of different alkaline earth metals, as well as mixtures of Mo and W, in any desired molar ratios.

Preferred molar ratios A:Bi and D:V are 0.1 to 0.3.

Preference is given to compounds of the formula I in which A is Ca or Sr, D is Mo or W and the molar ratios A:Bi and D:V are between 0.15 and 0.3.

Particular preference is given to compounds of the formula I in which A is Ca, D is Mo and the molar ratios Ca:Bi and Mo:V are between 0.15 and 0.3.

The invention further provides the novel compounds of the general formula (II) in a tetragonal, scheelitelike crystal structure $$(Bi,A)(V,D)O_4 \qquad (II)$$

in which A is an alkaline earth metal, Zn or a mixture thereof, D is Mo, W, or a mixture thereof, the molar ratio A:Bi is between 0.1 and 0.4 and the molar ratio D:V is between 0 and 0.4, although D must not be W when A is Ca.

Preferred molar ratios A:Bi and D:V are 0.1 to 0.3.

Preference is given to compounds of the formula (II) in which A is Ca, D is Mo and the molar ratios A:Bi and Mo:V are between 0.1 and 0.3.

The distinction between monoclinic and tetragonal crystal structure is made by recording the X-ray powder diffraction diagram. Although it is of course necessary to consider the whole diagram in an assessment, the region at a diffraction plane spacing of about 2.6 Å is particularly revealing. $BiVO_4$ in the stable beta-fergusonite structure, which has monoclinic symmetry, produces two lines of approximately equal intensity at d values of 2.546 Å and 2.598 Å. The compounds according to the invention have a tetragonal, scheelitelike structure and in this region exhibit only one line with a d value of about 2.58 Å.

The compounds of the formulae (I) and (II) can be prepared by various processes, including processes known per se, such as synthesis by solid state reaction at elevated temperature starting from the corresponding metal oxides, but in particular multistage processes. According to one of the process variants specified hereinafter, first a gellike precursor is precipitated and, after filtration, washing until salt-free and drying, is then subjected to a heat treatment at 300°–700° C., preferably at 350°–550° C., in the course of which it is converted into the crystalline, pigmentary form. This precursor can be prepared for example by mixing the solution of a bismuth(III) salt, for example in nitric or acetic acid, containing an alkaline earth metal or zinc salt or a mixture thereof with the aqueous solution of a vanadate salt and of a molybdate or tungstenate salt or of a mixture thereof.

The upper concentration limits of the abovementioned reaction solutions are determined by the solubility of the salts used, although the use of dilute solutions is advantageous, in particular in respect of better control of the equimolar step by step mixing of the solutions according to the invention. The solutions are expediently mixed at 10–100° C., preferably at 20°–30° C.

Bismuth(III) salt solutions can be prepared for example by dissolving bismuth nitrate [e.g. $Bi(NO_3)_3.5\ H_2O$-] in for example 1.0 to 4.0 N nitric acid or in acetic acid. Aqueous vanadate solutions can be prepared for example from alkali metal vanadate salts (for example sodium vanadate or potassium vanadate), ammonium vanadate or by dissolving vanadium(V) oxide in a basic solution. The molybdate or tungstenate salts used are for example the corresponding sodium, potassium or ammonium salts, or the corresponding oxides are dissolved in a basic solution.

Sources of alkaline earth metal or zinc salts are for example the corresponding chlorides, acetates and nitrates.

The precipitation reaction of the precursors can be carried out batchwise or continuously. Preferably the mixing of the solutions is effected with thorough stirring, if desired in a mixing system of high turbulence, for example in a flow reactor, in a mixing nozzle, if desired under elevated pressure, or in an apparatus provided with a high performance stirrer. The mixing of the various reaction solutions can be carried out not only continuously by simultaneous feed but also discontinuously by metering to one solution the other solution or solutions.

The normalities of the abovementioned acid and basic solutions are adjusted for example before the mixing in such a way that the pH of the resulting reaction mixture is between −1 and 6, but preferably below 3.

The (pigment) precursor of the compounds of the formulae (I) and (II) can also be prepared by mixing aqueous solutions of an alkaline earth metal or zinc salt or of a mixture thereof with the solution of a molybdate or tungstenate salt or of a mixture thereof to form a compound of the formula $ADO_4$ and then, after ageing, if desired at elevated temperature, simultaneously or sequentially mixing the compound with the aqueous solution of a bismuth(III) salt and the aqueous solution of a vanadate salt to form a compound according to the invention. The pH of the various starting solutions is preferably adjusted in such a way as to be in the acid range, but preferably not above 3, during the addition of these solutions.

A variant of the lastmentioned process comprises adding the solution of a bismuth(III) salt and of an alkaline earth metal or zinc salt or of a mixture thereof and the aqueous solution of a vanadate salt and of a molybdate or tungstenate salt or of a mixture thereof simultaneously to water.

In a novel process which is likewise provided by the invention, the compounds of the formulae (I) and (II) can also be prepared with a simpler process which no longer contains an expensive calcination step.

In this process, the precursors, prepared in accordance with the above directions, of the compounds of the formulae (I) and (II) are subjected to an ageing and crystallization process in the aqueous phase.

In this process, the pigment precursor is prepared as described above by mixing a solution containing a bismuth(III) salt and an alkaline earth metal or zinc salt or a mixture thereof with an aqueous solution containing a vanadate and a molybdate or tungstenate salt or a mixture thereof. The pH of the suspension thus obtained is then adjusted to between 5 and 8, preferably between 6 and 7, by adding an inorganic base, and the suspension is stirred for several hours. It is found to be advantageous to heat up the suspension, if desired in stages, for example to 90°–95° C., during or after the pH increase. To control the particle size and the crystallization of the particles formed it is also possible to add additives suitable for this purpose, for example chlorides. The pH can also be increased in stages for example by first stirring the suspension for some time, for example for 60 minutes, at for example pH 3.5 and only then further increasing the pH.

A further process variant comprises first mixing an aqueous solution containing an alkaline earth metal or zinc salt or a mixture thereof with an aqueous solution containing a molybdate or tungstenate salt or a mixture thereof to form a compound of the formula $ADO_4$, then mixing this compound after ageing simultaneously or sequentially with an aqueous solution containing a bismuth(III) salt and an aqueous solution containing a vanadate salt, adjusting the pH of the resulting suspension to between 5 and 8, preferably between 6 and 7, by adding an inorganic base, and then stirring the suspension for several hours, A, D and the molar ratios A:Bi and D:V being as defined above.

Suitable inorganic bases are for example NaOH or KOH, preferably in the form of an aqueous solution.

In the course of this aqueous aftertreatment the gel-like amorphous precursor turns into a crystalline brilliant yellow compound whose crystallinity, to judge by the X-ray powder diffraction diagram, has to be termed good. In general, 2–5 hours are sufficient to obtain complete crystallization.

Preferably the pH of the solutions containing bismuth(III) salts and vanadate salts is adjusted in such a way that the pH of the resulting suspension is within the acid range during the addition of these solutions.

Similar processes for preparing inorganic compounds based on bismuth vanadate have hitherto only been described in U.S. Pat. Nos. 4,115,141 and 4,151,142, the product being phase-pure monoclinic $BiVO_4$. However, the conditions specified therein are not suitable for the successful preparation of the compounds of the formulae (I) and (II), since for example an ageing at pH 3.5 leads to unsuitable products with a dirty greenish colour.

It is therefore surprising that by using the process according to the invention it is also possible to prepare solid solutions of the abovementioned compounds of the formulae (I) and (II). This is particularly surprising since alkaline earth metal vanadates, in particular Ca-vanadate, have a fairly high solubility, while the bismuth molybdates or tungstenates are extremely insoluble. It is further surprising that the compounds of the formulae (I) and (II) are present not in the crystal structure of the main component, namely that of bismuth vanadate, but in the tetragonal structure of the compound of the formula $ADO_4$, where A and D are as defined above.

The working up of the compounds of the formulae (I) and (II) is effected in a conventional manner, for example by filtering off, washing the filter cake with water to remove soluble salts, drying and pulverizing.

To improve the pigment properties, for example the stability to heat, light and chemical attacks, it is advantageous to coat the compounds of the formulae (I) and (II) used according to the invention during their preparation (precipitation) or in an aftertreatment in accordance with known processes described for example in U.S. Pat. Nos. 3,370,971, 3,639,133 and 4,046,588, with an inorganic protective coating. For this purpose, inorganic substances, for example aluminium, titanium, antimony, cerium, zirconium or silicon compounds or zinc phosphate or mixtures thereof are precipitated on to the compound of the formulae (I) and (II). This precipitation can be carried out in one or more stages. The amount of coating agent is expediently 2–40, preferably 2–20 and in particular 3–10%, based on the total weight of the compound.

To improve certain pigment properties, the compounds of the formulae (I) and (II) can additionally be treated with texture-improving agents, for example with long-chain aliphatic alcohols, esters, acids or salts thereof, amines, amides, waxes or resinous substances, such as abietic acid, hydrogenation products, esters or salts thereof, further with nonionic, anionic or cationic surface-active agents.

The compounds of the formulae (I) and (II) have good pigment properties and are highly suitable for pigmenting high molecular weight organic materials.

The high molecular weight organic material to be coloured according to the invention can be of natural or synthetic origin. Examples are natural resins or drying oils, rubber or casein and modified natural substances, such as chlororubber, oil-modified alkyd resins, viscose, cellulose ethers or esters, such as cellulose acetate, cellulose propionate, cellulose acetobutyrate or nitrocellulose, but in particular wholly synthetic organic polymers (thermosets and thermoplastics) as obtained by polymerization, polycondensation or polyaddition. Examples from the class of the polymerization resins are: polyolefines, such as polyethylene, polypropylene or polyisobutylene, substituted polyolefines, such as polymers of vinyl chloride, vinyl acetate, styrene, acrylonitrile, acrylic acid and/or methacrylic acid esters or butadiene, as well as copolymers of the monomers mentioned, in particular ABS or EVA. Examples from the series of polyaddition and polycondensation resins are the condensation products of formaldehyde with phenols, the socalled phenolic resins, and the condensation products of formaldehyde with urea, thiourea and melamine, the so-called amino resins, further the polyesters used as varnish resins, including not only saturated, for example alkyd resins, but also unsaturated, for example maleic resins, further the linear polyesters, polyamides and polycarbonates or silicones. The high molecular weight compounds mentioned can be present individually or as mixtures, as plastic materials or melts which if desired can be spun into fibres. They can also be present in dissolved form as film formers or binders for lacquers, paints or printing inks, for example linseed oil varnish, nitrocellulose, alkyd resins, melamine resins and urea-formaldehyde resins or acrylic resins.

The pigmenting of high molecular weight organic substances with compounds of the formulae (I) and (II) is effected for example by admixing a compound of this type, if desired in the form of a masterbatch, into these substrates using rolls or mixing or milling apparatuses. The pigmented material is then brought into the desired final form by processes known per se, such as calendering, pressing, extruding, brushing, casting or injection moulding. Frequently it is desirable, if non-rigid mouldings are to be prepared or to reduce the brittleness thereof, to incorporate plasticizers into the high molecular weight compounds before moulding. Suitable plasticizers are, for example, esters of phosphoric acid, phthalic acid or sebacic acid. The plasticizers can be incorporated in the process according to the invention before or after the incorporation of compounds according to the invention into the polymers. It is further possible, for the purpose of obtaining different colours, to add to the high molecular weight organic substances, in addition to the compounds of formulae (I) and (II), fillers or other colouring constituents, such as white, colour or black pigments, in any desired amounts.

To pigment lacquers, paints and printing inks, the high molecular weight organic materials and the compounds of the formulae (I) and (II), if desired together with additives, such as fillers, other pigments, siccatives or plasticizers, are finely dispersed or dissolved in a common organic solvent or solvent mixture. This can be done by dispersing or dissolving the individual components separately or together in groups, and only then combining all the components.

The compounds of the formulae (I) and (II) can be present in the material which is suitable according to the invention for example in an amount of 0.001 to 40% by weight, based on the material, but in particular of 0.01 to 20% by weight.

In colourings, for example of plastics, fibres, lacquers, paints or prints, the compounds of the formulae (I) and (II) are distinguished by good general pigment properties, such as good dispersibility, high tinctorial strength, purity, high hiding power, good overlacquering, migration, heat, light and weathering resistance, and good resistance to chemicals, such as acids, bases, organic solvents and industrial atmosphere. In addition they confer on the printing inks, paints and lacquers prepared therefrom good rheological behaviour and on the dried films a high gloss.

In the examples below, the percentages are by weight. The composition of the compounds is specified by elemental analysis and molar ratios A:Bi and D:V calculated therefrom. The bismuth(III) oxide content is calculated from the other, directly determined contents.

EXAMPLE 1

An aqueous solution containing 5.61 g of $Ca(NO_3)_2 \cdot 4H_2O$ and an aqueous solution containing 5.7 g of $Na_2MoO_4 \cdot 2H_2O$ are mixed at room temperature with thorough stirring, and the resulting precipitate consisting of $CaMoO_4$ is aged at that temperature for one hour. The suspension is then heated to 90° C., whereupon the following solutions are added to this suspension simultaneously in the course of 30 minutes: 289 ml of 1 N $HNO_3$ containing 46.08 g of $Bi(NO_3)_3 \cdot 5H_2O$ and 289 ml of water containing 13.29 g of $NaVO_3 \cdot H_2O$ and 12 g of NaOH (final pH: 3).

The pH of the suspension thus obtained is adjusted to 6 by means of a 30% NaOH solution, and the suspension is stirred at 90° C. for 3 hours. The product obtained is then filtered off, washed thoroughly with cold water and dried at 95° C. in a vacuum drying cabinet. This gives 34.4 g of a brilliant greenish yellow powder giving the following elemental analysis:

Ca: 2.7%; V: 12.9%; Mo: 5.4%.

This gives the following molar ratios:

Ca:Bi=0.24; Mo:V =0.22.

The X-ray diagram shows a tetragonal structure.

EXAMPLE 2

(Bi, Ca)(V,Mo)$O_4$ having a degree of substitution of about 20 mol %.

19.4 g of Bi(NO$_3$)$_3$.5H$_2$O and 2.36 g of Ca(NO$_3$)$_2$.4H$_2$O are dissolved in 120 ml of 1 N HNO$_3$. While stirring, a solution of 5.6 g of NaVO$_3$.H$_2$O, 2.42 g of Na$_2$MoO$_4$.2H$_2$O0 and 4 g of NaOH in 120 ml of water is added. The pH of the suspension thus obtained is about 0.2 and is adjusted to 3.5 with 30% sodium hydroxide solution. The suspension is then stirred at that pH and room temperature for 1 hour. The pH is then raised to 6 in the course of one hour by gradual addition of 1 N sodium hydroxide solution. The suspension is then heated to the refluxing temperature while the pH of this suspension is maintained at 6 by further addition of 1 N sodium hydroxide solution (for example by means of a pHstat). The pH is maintained at 6 until the suspension starts turning yellow and a spontaneous pH increase occurs. The pigment suspension is then stirred under reflux for a further 2 hours, during which the pH rises to about 8, and is subsequently filtered off, and the residue is washed until salt-free and dried at 90° C. in a vacuum drying cabinet. This gives 14 g of a bright yellow pigment powder giving the following elemental analysis:

Ca: 2.6%; V: 13.2%; Mo: 6.6%. This gives the following molar ratios:

Ca:Bi =0.24; Mo:V =0.27.

The X-ray diagram shows a tetragonal structure.

EXAMPLE 3

Preparation of (Bi,Ca)(V,Mo)$O_4$ having a degree of substitution of 10-30 mol %.

(a) Example 2 is repeated, except that the following amounts of substances are used:

174.6 g of Bi(NO$_3$)$_3$.5H$_2$O and 9.45 g of Ca(NO$_3$)$_2$.4H$_2$O in 360 ml of 1 N HNO$_3$; 50.38 g of NaVO$_3$.H$_2$O, 9.69 g of Na$_2$MoO$_4$.2H$_2$O and 12.0 g of NaOH in 360 ml of water. 121.3 g of pigment are obtained: Analysis of product obtained:

Ca: 1.2%; V: 13.4%; Mo: 1.5%. This gives the following molar ratios:

Ca:Bi=0.10; Mo:V =0.06.

X-ray analysis shows that the pigment is present in a tetragonal structure.

(b) Example 2 is again repeated, except that the following amounts of substances are used: 135.82 g of Bi(NO$_3$)$_3$. 5H$_2$O, 28.34 g of Ca(NO$_3$)$_2$.4H$_2$O in 280 ml of 1 N HNO$_3$ and 39.18 g of NaVO$_3$.H$_2$O, 29.03 g of Na$_2$MoO$_4$.2H$_2$O and 12 g of NaOH in 360 ml of water. Yield: 113.5 g.

Analysis: Ca: 4.0%; V: 11.3%; Mo:8.5%. This gives the following molar ratios:

Ca:Bi =0.38; Mo:V =0.4.

X-ray: tetragonal crystal structure.

EXAMPLE 4

Preparation of (BiCa)(V,W)$O_4$ having a degree of substitution of about 10-20 mol %.

(a) 174.6 g of Bi(NO$_3$)$_3$.5H$_2$O and 9.45 g of Ca(NO$_3$)$_2$.4H$_2$O are dissolved in 360 ml of 1 N HNO$_3$. While stirring a solution containing 50.38 g of NaVO$_3$.H$_2$O, 13.19 g of Na$_2$WO$_4$. 2H$_2$O and 12 g of NaOH in 360 ml of water is added. Thereafter the procedure of Example 2 is followed. This gives 125.2 g of a yellow pigment giving the following analytical values:

Ca: 1.2%; V: 13.2%; W: 3.4%. This gives the following molar ratios:

Ca:Bi=0.10; W:V=0.07.

According to the X-ray diagram the substance is present in a tetragonal crystal structure.

(b) Example 2 is repeated, except that the following amounts of substances are used:

155.22 g of Bi(NO$_3$)$_3$.5H$_2$O and 18.9 g of Ca(NO$_3$)$_2$.4H$_2$O in 280 ml of 1 N HNO$_3$; 44.78 g of NaVO$_3$.H$_2$O, 26.38 g of Na$_2$WO$_4$.2H$_2$O and 12 g of NaOH in 360 ml of water, affording 123.9 g of pigment.

Analysis:

Ca: 2.5%; V: 12.1%; W: 9.5%. This gives the following molar ratios:

Ca:Bi=0.23; W:V =0.22.

X-ray: tetragonal crystal structure.

EXAMPLE 5

Preparation of (Bi,Sr)(V,Mo)$O_4$ having a degree of substitution of about 20 mol %.

155.22 g of Bi(NO$_3$)$_3$.5H$_2$O and 16.93 g of Sr(NO$_3$)$_2$ are dissolved in 960 ml of 1 N HNO$_3$. While stirring, a solution of 44.78 g of NaVO$_3$.H$_2$O, 19.26 g of Na$_2$MoO$_4$.2H$_2$O and 32 g of NaOH in 950 ml of water is added. Subsequently the procedure of Example 2 is followed. This gives 120.5 g of pigment.

Analysis:

Sr: 6.5%; V: 12.1%; Mo: 5.5%. This gives the following molar ratios:

Sr:Bi =0.28; Mo:V =0.24.

X-ray: tetragonal crystal structure.

EXAMPLE 6

Preparation of (Bi,Zn)(V,MO)$O_4$ having a degree of substitution of about 20 mol %.

19.4 g of Bi(NO$_3$)$_3$.5H$_2$O and 2.61 g of Zn(NO$_3$)$_2$.4H$_2$O are dissolved in 120 ml of 1 N HNO$_3$. While stirring, a solution containing 5.6 g of NaVO$_3$.H$_2$O, 2.42 g of Na$_2$MoO$_4$.2H$_2$O and 4 g of NaOH in 120 ml of water is added. Subsequently the procedure of Example 2 is followed. This gives 13.3 g of a yellow pigment.

Analysis:

Zn: 4.3%; V: 13.5%; Mo: 2.9%. This gives the following molar ratios:

Zn:Bi=0.23; Mo:V =0.11.

X-ray: tetragonal crystal structure.

EXAMPLE 7

Preparation of (Bi,Ba)(V,MO)$O_4$ having a degree of substitution of about 20 mol %.

19.4 g of Bi(NO$_3$)$_3$.5H$_2$O and 2.61 g of Ba(NO$_3$)$_2$ are dissolved in 120 ml of 1 N HNO$_3$. While stirring, a solution containing 5.60 g of NaVO$_3$.H$_2$O, 2.42 g of Na$_2$MoO$_4$ 2H$_2$O and 4 g of NaOH in 120 ml of water is added. Subsequently the procedure of Example 2 is followed, except that the pigment is aged by stirring not for 2 but for 5 hours. This gives 15.2 g of a greenish yellow pigment.

Analysis:

Ba: 7.62%; V: 12.2%; Mo: 5.5%. This gives the following molar ratios:

Ba:Bi=0.21; Mo:V =0.24.

X-ray: tetragonal crystal structure.

EXAMPLE 8

Preparation of (Bi,Ca)VO$_4$ having a degree of substitution of about 10 mol %.

43.65 g of Bi(NO$_3$)$_3$.5H$_2$O and 3.54 g of Ca(NO$_3$)$_2$.4H$_2$O are dissolved in 290 ml of 1 N HNO$_3$. While stirring, a solution containing 13.9 g of NaVO$_3$.H$_2$O and 8 g of NaOH in 300 ml of water is added. On completion of the addition, the pH is adjusted to 3 with 30% sodium hydroxide solution, and the suspension is heated to 95° C. After 3 hours of stirring the pH is increased to 6 by adding 1 N sodium hydroxide solution, and the suspension is stirred at 95° C. for 5 hours.

Conventional isolation and drying of the suspension gives 30 g of a yellow pigment.

Analysis:

Ca: 1.50%; V: 15.50%; this gives the following molar ratios:

Ca:Bi=0.12.

According to the X-ray powder diffraction diagram the pigment has a tetragonal crystal structure.

EXAMPLE 9

Preparation of an SiO$_2$-coated(Bi,Ca)(V,Mo)O$_4$ pigment.

10 g of a pigment prepared as described in Example 2 are predispersed in 100 ml of water containing 1.6 g of sodium silicate (26.5% of SiO$_2$, SiO$_2$:Na$_2$O=3.25) for 16 hours. The suspension is then dispersed in one pass through a Manton-Gaulin high pressure homogenizer under a pressure of 202.6×10$^5$ Pa (=about 200 atm). The suspension is heated to 90° C., and the following solutions are metered in simultaneously over a period of 4 hours.

7 g of sodium silicate in 50 ml of water;

16.3 ml of 1 N H$_2$SO$_4$ in 50 ml of water.

On completion of the addition the pH of the suspension is 9.7. This suspension is subsequently stirred for 2 hours, and the pH is then adjusted to about 6.2 by adding 1 N of H$_2$SO$_4$. A solution containing 1 g of dioctyl adipate and 0.5 g of sodium dodecylsulfonate in about 10 ml of water (dispersed with ultrasound) is then added. After 15 minutes 15 ml of a 25% Al$_2$(SO$_4$)$_3$.18H$_2$O solution in water are added, whereupon the pH drops to 2.4. By gradual addition of 1 N NaOH the pH of the suspension is adjusted to 3.1, and the product is then filtered off, washed until salt-free and dried.

EXAMPLE 10

Application example in HDPE:

3 g of the pigment according to the invention from Example 2 and 1000 g of ®, Vestolen 6016 (supplier: HUELS) are weighed into a 3-1 glass flask and dry-mixed for 2 hours. The mixture is then extruded twice at 200° C. and subsequently granulated. Finally, 1.5 mm thick platelets are produced on an injection moulding machine, the heat stability being tested by exposing the injection moulding material to a temperature between 220° C. and 300° C. for 5 minutes in each case. The pigment is distinguished by excellent heat stability.

EXAMPLE 11

(Application example in PVC): 0.5 g of the pigment obtained as described in Example 1 are mixed with 76 g of polyvinyl chloride, 33 g of dioctyl phthalate, 2 g of dibutyltin dilaurate and 2 g of titanium dioxide, and the mixture is processed on a roll mill at 160° C. for 15 minutes to give a thin film. The greenish yellow colouring thus produced is strong, has high hiding power and is migration and light-resistant.

EXAMPLE 12

(Application in alkyd-melamine baking finish): 60 g of a 60% solution of a non-drying alkyd resin in xylene (trade name ®Beckosol 27-320 from Reichhold-Albert-chemie), 36 g of a 50% solution of a melamin formaldehyde resin in a butanol-xylene mixture (trade name ®SuperBeckamin 13-501 from Reichhold-Albert-Chemie), 2 g of xylene and 2 g of methylcellosolve are mixed, and 100 g of this mixture is stirred by means of a stirrer to give a homogeneous surface coating solution.

30 g of the clearcoating finish thus obtained, 10 g of the pigment obtained in Example 1, 9 ml of methyl isobutyl ketone and 135 g of glass beads (4.5 mm diameter) are dispersed for 16 hours in a Vibratom vibrating mill (from Siebtechnik, Mülheim/Ruhr, West Germany). The surface coating thus obtained is drawn out by means of an Erichsen film drawing instrument (type 238/1) on a vinyl coated aluminium strip, the applied film is then flashed off for one hour and is baked at 130° C. for 30 minutes. This gives a brilliant, greenish yellow and light-resistant coating.

I claim:

1. A process for mass colouring high molecular weight organic material, which comprises incorporating into said organic material an effective coloring amount of a compound of the formula (I)

(Bi,A)(V,D)O$_4$   (I)

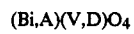

in a tetragonal, scheelitelike crystal structure, in which A is an alkaline earth metal, Zn or a mixture thereof, D is Mo, W or a mixture thereof, the molar ratio A:Bi is between 0.1 and 0.4, and the molar ratio D:V is between 0 and 0.4.

2. A process according to claim 1, wherein the molar ratios A:Bi and D:v are between 0.1 and 0.3, respectively.

3. A process according to claim 1, wherein A is Ca or Sr, D is Mo or W, and the molar ratios A:Bi and D:V are between 0.15 and 0.3, respectively.

4. A process according to claim 1, wherein A is Ca, D is Mo and the molar ratios Ca:Bi and Mo:V are between 0.15 and 0.3, respectively.

5. A compound of the general formula (II)

(Bi,A)(V,D)O$_4$   (II)

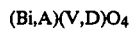

in a tetragonal, scheelitelike crystal structure, in which A is an alkaline earth metal, Zn or a mixture thereof, D is Mo, W or a mixture thereof, the molar ratio A:Bi is between 0.1 and 0.4 and the molar ratio D:V is between 0 and 0.4, although D must not be W when A is Ca.

6. A compound of the formula (II) according to claim 5, in which the molar ratios A:Bi and D:V are between 0.1 and 0.3, respectively.

7. A compound of the formula (II) according to claim 5, in which A is Ca, D is Mo and the molar ratios Ca:Bi and Mo:V are between 0.15 and 0.3, respectively.

8. A process for preparing a compound of the formula (Bi,A)(V,D)O$_4$ in a tetragonal, scheelitelike crystal structure, wherein A is an alkaline earth metal, Zn or a mixture thereof, and D is Mo, W or a mixture thereof, which comprises mixing a solution containing a bismuth(III) salt and an alkaline earth metal or zinc salt or a mixture thereof with an aqueous solution containing a vanadate salt and a molybdate or tungstenate salt or a mixture thereof, then adjusting the pH of the resulting suspension to between 5 and 8 by adding an inorganic base, and stirring the suspension for several hours, the molar ratios A:Bi and D:V being 0.1 to 0.4 and 0. to 0.4, respectively.

9. A process according to claim 8, wherein the pH of the solutions containing bismuth(III) salts and vanadate salts is adjusted such that the pH of the resulting suspension is within the acid range during the addition of these solutions.

10. A process according to claim 8, wherein additionally the resulting compounds are coated with an inorganic protective coating.

11. A process for preparing a compound of the formula $(Bi,A)(V,D)O_4$ in a tetragonal, scheelitelike crystal structure, wherein A is an alkaline earth metal, Zn or a mixture thereof, and D is Mo, W or a mixture thereof, which comprises first mixing an aqueous solution containing an alkaline earth metal or zinc salt or a mixture thereof with an aqueous solution containing a molybdate or a tungstenate salt or a mixture thereof to form a compound of for formula $ADO_4$, then, after ageing, mixing this compound simultaneously or sequentially with an aqueous solution containing a bismuth(III) salt and an aqueous solution containing a vanadate salt, adjusting the pH of the resulting suspension to between 5 and 8 by adding an inorganic base, and stirring the suspension for several hours, the molar ratios A:Bi and D:V being 0.1 to 0.4 and 0 to 0.4, respectively.

12. A process according to claim 11, wherein the pH of the solutions containing bismuth(III) salts and vanadate salts is adjusted such that the pH of the resulting suspension is within the acid range during the addition of these solutions.

13. A process according to claim 11 wherein additionally the resulting compounds are coated with an inorganic protective coating.

14. A colored high molecular weight organic material comprising a high molecular weight organic material and an effective coloring amount of a compound of the formula (I) $(Bi,A)(V,D)O_4$ in a tetragonal, scheelitelike crystal structure, in which A is an alkaline earth metal, Zn or a mixture thereof, D is Mo, W or a mixture thereof, the molar ratio A:Bi is between 0.1 and 0.4, and the molar ratio D:V is between 0 and 0.4.

* * * * *